United States Patent [19]

Sasaki

[11] Patent Number: 4,982,144

[45] Date of Patent: Jan. 1, 1991

[54] NUMERICAL CONTROL APPARATUS

[75] Inventor: Takao Sasaki, Hachioji, Japan

[73] Assignee: Fanuc Ltd, Minamitsuru, Japan

[21] Appl. No.: 315,791

[22] PCT Filed: Jul. 21, 1988

[86] PCT No.: PCT/JP88/00735
§ 371 Date: May 19, 1989
§ 102(e) Date: May 19, 1989

[87] PCT Pub. No.: WO89/00724
PCT Pub. Date: Jan. 26, 1989

[30] Foreign Application Priority Data

Jul. 21, 1987 [JP] Japan ................................ 62-181669

[51] Int. Cl.[5] ............................................. G05B 19/18
[52] U.S. Cl. .............................. 318/569; 364/474.19; 364/474.28
[58] Field of Search ................... 318/569; 364/474.19, 364/474.28

[56] References Cited

U.S. PATENT DOCUMENTS 4,511,975  4/1985  Nozawa et al. ................ 364/474.19
4,584,638  4/1986  Akasofu ......................... 364/474.28
4,692,872  9/1987  Kiya ............................... 318/569 X Primary Examiner—William M. Shoop, Jr.
Assistant Examiner—Saul M. Bergmann
Attorney, Agent, or Firm—Staas & Halsey

[57] ABSTRACT

A numerical control (NC) apparatus according to the invention provides a command execution function in which a movement command and an operation command are output from an NC tape as NC commands of the same block. A movement completion signal is formed at the moment movement of a tool based on the movement command ends, thereby designating an operation on a machine side based on the operation command. The arrangement is such that a pseudo-signal (DEN.A), which includes a parameter element that can be designated by a program, and an original movement completion signal (DEN.B) can be selected as movement completion signals.

9 Claims, 3 Drawing Sheets

FIG. I

NUMERICAL CONTROL APPARATUS

BACKGROUND OF THE INVENTION

1. Technical Field

This invention relates to a numerical control apparatus in which it is possible to control the start of execution of machine-side operations such as M, S, T and B functions.

2. Related Art

When using a numerical control (NC) apparatus for controlling a machine tool based on ordinary decoded NC commands, there are two known methods of executing commands when both a movement command and an operation command are issued from the same block. Specifically, in a first method, in which execution of a tool movement command starts at the same time as execution of an operation command (see FIG. 4). In a second method, the operation command is executed after execution of the movement command (see FIG. 5).

Of the first and second methods for controlling machine tools by NC commands, the first or second method is selected depending upon particulars of the operation to be performed by the machine tool. For example, among commands based on M-codes (auxiliary function codes), the operation command is output to the machine side using the first method with regard to M03, M04 and M05 (control for rotating and stopping a spindle) and the second method with regard to M20 and M21.

When an NC command for drilling a plurality of holes in a workpiece is delivered to the machine tool in this known numerical control apparatus, both a movement command for moving the tool to a predetermined position on the workpiece and an operation command for the drilling operation at this position are read and decoded by the numerical control apparatus from a single data block, and used to control the operation of the machine tool. If the first method mentioned above is adopted as the function for executing commands, it is required that coolant is supplied by a coolant start command executed at the same time that the tool is moved. If a long period of time is required to move the tool, coolant is wasted correspondingly. If the second method is adopted, on the other hand, start of coolant supply is commanded at the end of tool movement in response to execution of the movement command. When this is done, however, a time delay due to an exchange of signals between the numerical control apparatus and the machine tool is involved before the supply of coolant starts, and a great deal of time is wasted in the overall machining operation particularly in a case where the tool traveling distance on the workpiece is short.

In order to solve this problem which arises owing to the relationship between tool movement and the operation commanded on the machine side, in the prior art, the traveling distance commanded at the same time as the operation command on the machine side is limited to a fixed value, the distance required is commanded by being split between two data blocks, and the tool is moved by executing these commands in succession. Yet even in this case there is no essential solution to the problem; all that is done is to make the NC commands more complicated and place an extra burden upon the operator.

SUMMARY OF THE INVENTION

The present invention solves this problem by providing a numerical control apparatus having a command execution function for executing an operation command before completion of tool movement in analogy with the function of executing an operation command at the end of a movement command.

The numerical control apparatus of the present invention provides for execution of an operation command on a machine side (by a machine) at a predetermined time before completion of tool movement. The present invention allows control for starting the execution of a machine-side operation such as miscellaneous auxiliary M, spindle S, tool T and second auxiliary B functions to be performed without complicated NC commands and without an added burden upon the operator.

In accordance with the present invention, a numerical control apparatus provides means for forming a pseudo-movement completion signal at any time between the start of execution of the movement command and the completion of movement. Means are also provided for decoding an operation command, which is designated on the machine side, by a pseudo-movement completion signal, it thereby allowing execution of a operation command before completion of tool movement.

The numerical control apparatus of the present invention is such that an operation command designated on the machine side is decoded by a pseudo-movement completion signal formed at any time from start of execution of the movement command to completion of movement, with the operation command being executed before completion of tool movement.

DESCRIPTION OF THE PREFERRED EMBODIMENTS

The present invention will now be described in detail with reference to the drawings.

Figure 1:
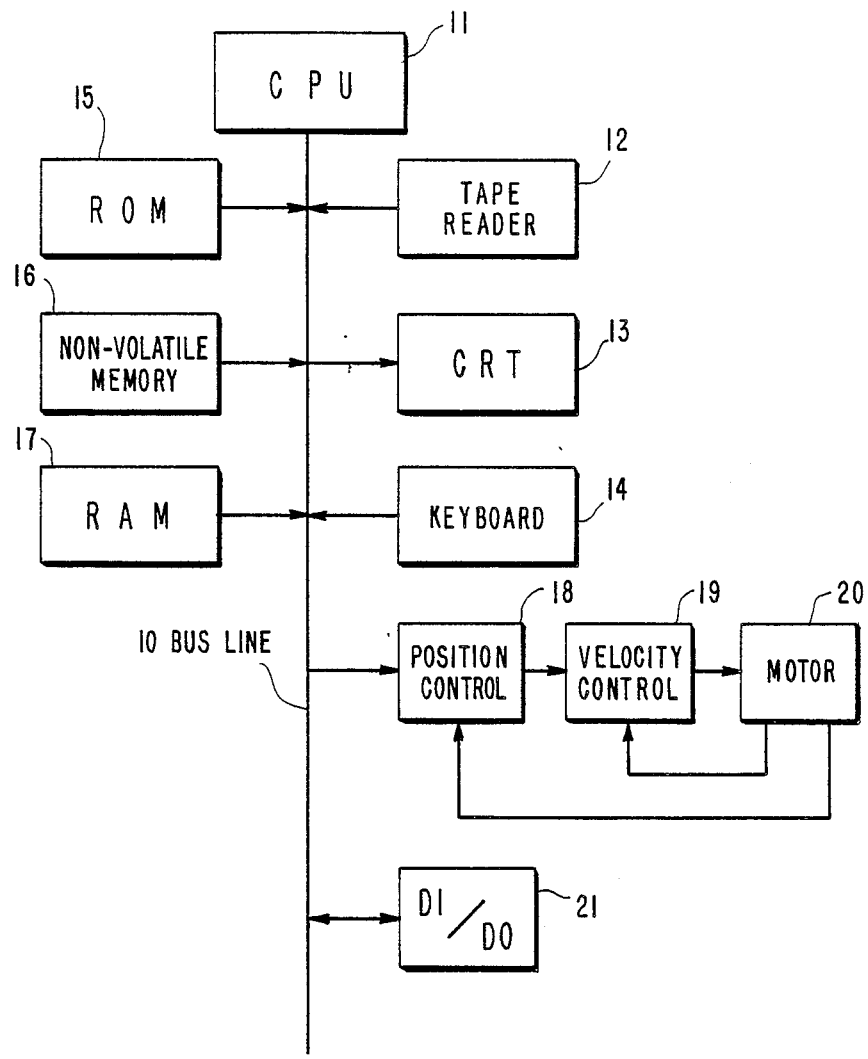
FIG. 1 is a block diagram illustrating an embodiment of the numerical control apparatus of the present invention.

FIG. 1 is a block diagram illustrating an example of a numerical control apparatus for controlling an NC machine tool. A processing unit (CPU) 11 for forming command data for a machine tool is connected, via a bus line 10, to a tape reader 12 for reading NC commands from an NC tape. A CRT 13 serves as a display unit and a keyboard 14 receives data input manually for the purpose of revising a program. Also connected to the CPU are a ROM 15 storing a control program for operating the system efficiently, and a non-volatile memory 16 for storing control programs in part for the purpose of milling and the like and for storing data necessary for machining.

Connected to the bus line 10 of CPU 11 is a writable RAM 17 used as a working memory for controlling a motor 20, which is used for moving a tool along a predetermined axis, via position control means 18 and velocity control means 19. An input/output unit (DI/DO) 21 which exchanges operation control signals, for M, S, T and B functions (miscellaneous auxiliary, spindle, tool and second miscellaneous auxiliary functions, respectively) and the like, with the machine side is connected to the machine tool directly or through a PMC (programmable machine controller) or the like. Though the motor 20 illustrated in FIG. 1 is for one axis only, in actuality at least three motors, position control means and velocity control means each are provided in order to move and control the tool of the machine tool freely in three-dimensional space.

Figure 2:
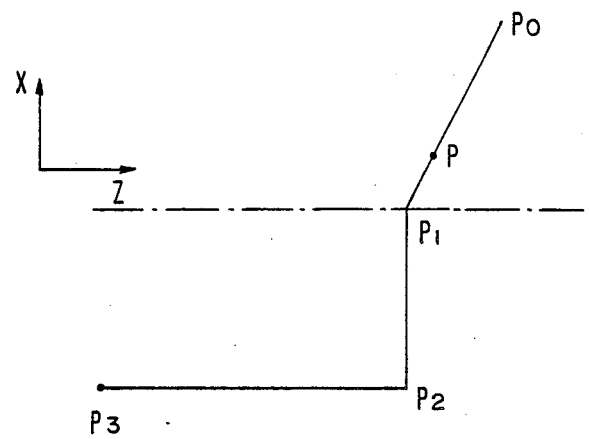
FIG. 2 is a timing diagram illustrating an example movement control.

FIG. 2 illustrates an example of the path of a tool moved from point Po to points P1, P2, P3 by NC data from the tape reader 12.

Various operations performed by the NC machine tool are expressed by the following data block (variable block word address format) in terms of the NC tape. Specifically, each data block commands one operation of the machine tool by of a plurality of word. A word comprises both an address and a numerical value. The address indicates the meaning of a numerical value following the address.

Figure 3:
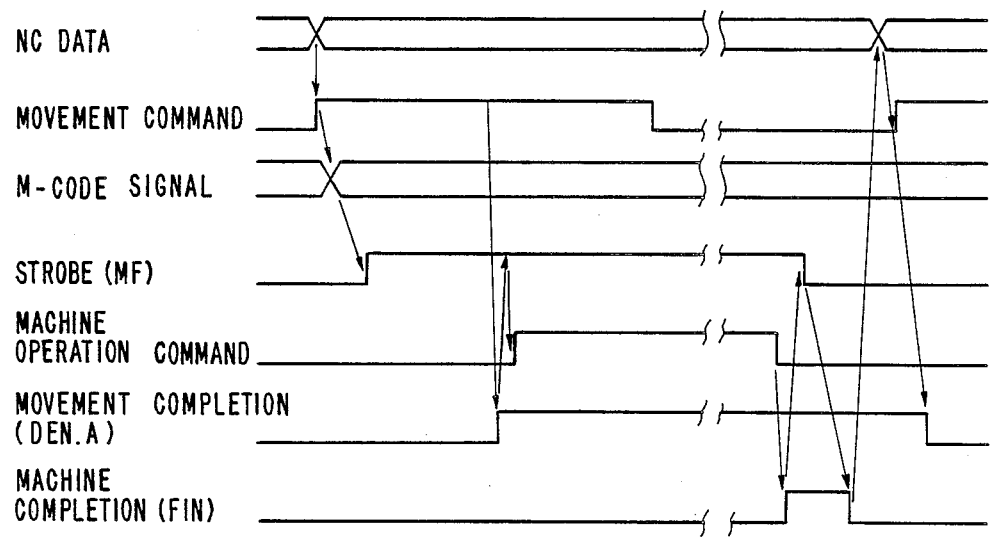
FIG. 3 is an explanatory view illustrating timing where an operation command is executed before the end of movement according to FIG. 2.

For example, in accordance with FIG. 2, a tool is positioned from point Po to point P1, P1 to position it at point P1 and machine it in accordance with a first data block and the workpiece (illustrated by the side below the one-dot chain line) is machined from point P2 to point P3, by a next data block. Commands from the NC tape are executed at the timing shown in FIG. 3.

The data block format is as follows:

N1 G91 G00 X−100.0 Z50.0 Q20 M07

Specifically, when a dimension word (X−100.0 Z50.0) which follows G00 indicative of the position function in the data block is read out, the CPU 11 outputs a predetermined movement command upon decoding the dimension word. Then, when the M-code signal is read out, the CPU outputs a strobe (MF), which is the code read command. In order to execute a coolant-on command issued in accordance with operation command M07, when the tool arrives at a point between points Po and P1, a Q code is inserted between the positioning code G00 and the M code in the abovementioned data block. This Q code, which has a numerical value following it that designates the remaining traveling distance 20 (mm) of the miscellaneous auxiliary tool, specifies the point P at which the (M) function is to be executed. As a result, when the tool arrives at the point P, a pseudo-movement completion signal (DEN.A) is output. When this signal and the strobe (MF) satisfy an AND condition, the machine operation command M07 is immediately executed.

Thus, even though a tool movement command and an operation command on the machine side are output as NC commands of the same data block, in the above-described numerical control apparatus, the command for the machine operation is decoded after the tool is moved to a point, a designated distance short of the workpiece. Therefore, coolant-on (M07) is executed after the tool arrives at a position a required distance short of the workpiece, and wasting of coolant can be eliminated.

Figure 4:
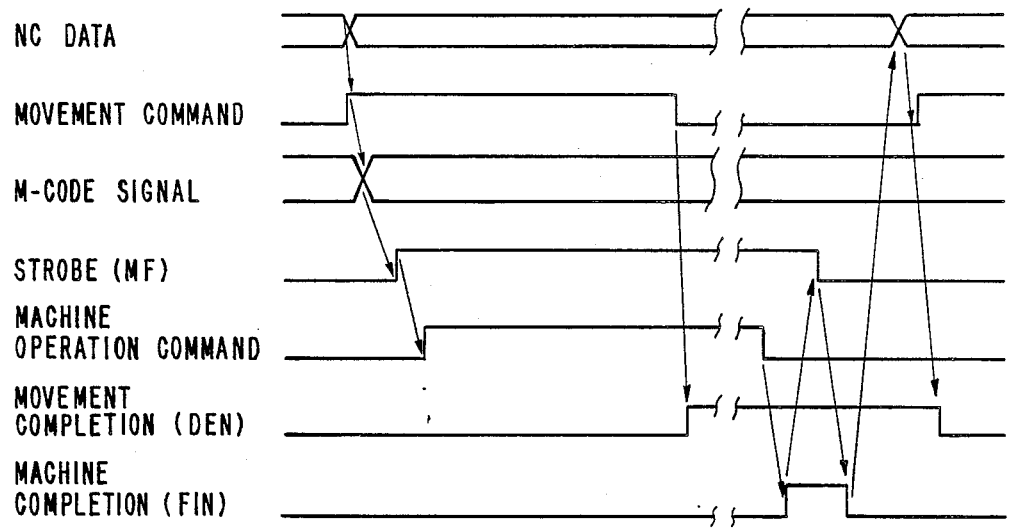
FIG. 4 is an explanatory view illustrating prior art timing where an operation command is executed at the same time as a movement command.
Figure 5:
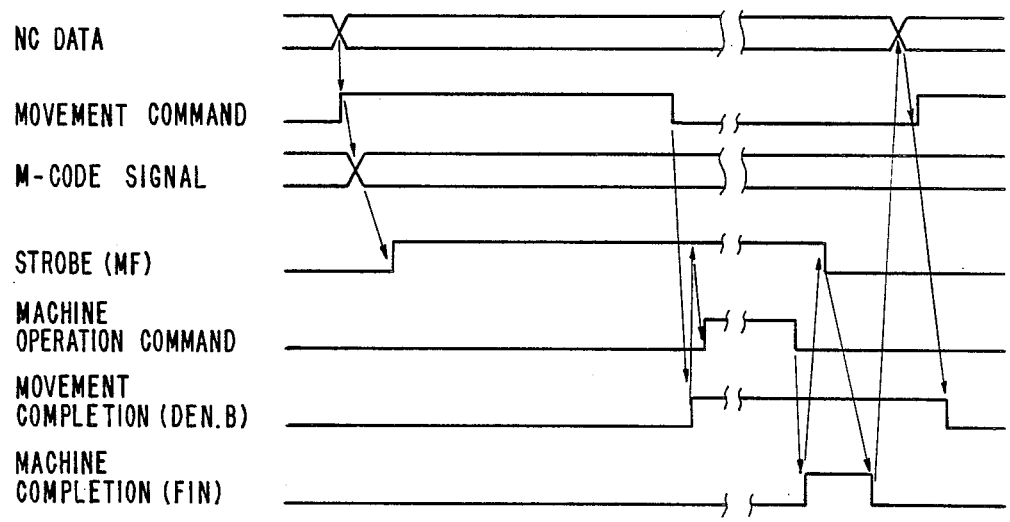
FIG. 5 is an explanatory view illustrating prior art timing where an operation command is executed at the end of movement.

In a case where the distance between points Po and P1 is short, the M code can be executed at the same time that movement from point Po starts without the Q code being inserted, just as in the prior-art method (see FIG. 4). The timing chart of prior art FIG. 4 illustrates timing for a case where an operation command is executed at the same time as a movement command. As shown in prior art FIG. 5, it is also possible to adopt a set-up in which, depending upon the particulars of the operation command designated by or based on the M-code, a movement completion signal (DEN.B) formed at the moment movement ends is output, thereby starting operation on the machine side.

In the above-described embodiments, the timing for generating the timing the pseudo-movement completion signal (DEN.A) in the above-described embodiment is set by designating the remaining traveling distance of the tool. However, when the traveling velocity is set along with the G code (G00), it is preferred that the numerical value following the Q code be changed from units of distance to units of time.

In the above-described embodiments, the operation command on the machine side is commanded by the miscellaneous auxiliary function (code M).

As an alternative, to the miscellaneous auxiliary function (M-code), the present invention can similarly be used when a operation command on the machine side is commanded by a spindle function S, a tool function T or a second auxiliary function B.

Although many embodiments of the present invention have been described, the invention is not limited thereto and can be modified in a variety of ways without departing from the scope of the claims.

What is claimed is:

1. A numerical control apparatus having a command execution function in which a tool movement command and a machine operation command are output from an NC tape as NC commands of the same block, and a movement completion signal is formed when a movement of a tool based on the tool movement command ends, thereby designating the onset of an operation on a machine side based on said machine operation command, the apparatus comprising:
   pseudo-signal forming means for forming a pseudo-movement completion signal at any point between start of execution of said tool movement command and completion of movement; and
   decoding means for decoding said machine operation command, which is designated for a machine operation on the machine side, in response to the pseudo-movement completion signal.

2. A numerical control apparatus according to claim 1, wherein the point at which the pseudo-movement completion signal is generated by said pseudo-signal forming means is determined in accordance with a traveling distance of the tool.

3. A numerical control apparatus according to claim 1, wherein the point at which the pseudo-movement completion signal is generated by said pseudo-signal forming means is determined by an amount of time relative to completion of tool movement.

4. A numerical control method having a command execution step in which a tool movement command and a machine operation command are output from an NC tape as NC commands of the same block, said method comprising the steps of:
   (a) generating a pseudo-movement completion signal at any point between start of execution of said tool movement command and completion of movement; and (b) executing a machine operation command, designated for a machine operation on the machine side, in response to the pseudo-movement completion signal.

5. A numerical control method according to claim 4, further comprising the step of determining the point at which the pseudo-movement completion signal is generated in accordance with traveling distance of the tool.

6. A numerical control method according to claim 4, further comprising the step of determining the point at which the pseudo-movement completion signal is generated in accordance with tool movement time.

7. A numerical control apparatus capable of executing a tool movement command followed by a machine operation command, the machine operation command being executed following the tool movement command in response to a movement completion signal, the apparatus comprising:

a tool movement detector to output the movement completion signal as a pseudo-movement completion signal when the tool movement command reaches a predetermined point between start of execution of said tool movement command and completion of movement; and a machine controller to execute the machine operation command in response to the pseudo-movement completion signal.

8. A numerical control apparatus according to claim 7, wherein said tool movement detector outputs the pseudo-movement completion signal in accordance with a traveling distance of the tool.

9. A numerical control apparatus according to claim 7, wherein said tool movement detector outputs the pseudo-movement completion signal in accordance with a length of tool movement time.

* * * * *